(12) United States Patent
Blaho

(10) Patent No.: US 7,198,312 B2
(45) Date of Patent: Apr. 3, 2007

(54) ARRANGEMENT FOR HANDLING OBJECTS SUCH AS NURSERY STOCK OR THE LIKE

(76) Inventor: Milan D. Blaho, 10631 E. 234th St., Cicero, IN (US) 46034

(*) Notice: Subject to any disclaimer, the term of this patent is extended or adjusted under 35 U.S.C. 154(b) by 7 days.

(21) Appl. No.: 11/170,204

(22) Filed: Jun. 29, 2005

(65) Prior Publication Data

US 2005/0285420 A1    Dec. 29, 2005

Related U.S. Application Data

(60) Provisional application No. 60/583,666, filed on Jun. 29, 2004.

(51) Int. Cl.
*B66C 3/16* (2006.01)
(52) U.S. Cl. ................... 294/106; 294/88; 294/902; 414/23
(58) Field of Classification Search ............. 294/68.23, 294/86.4, 86.41, 88, 106, 902; 414/23, 739, 414/607; 37/406, 903
See application file for complete search history.

(56) References Cited

U.S. PATENT DOCUMENTS

| | | | | | |
|---|---|---|---|---|---|
| 2,795,347 | A | * | 6/1957 | Schenkelberger | 414/607 |
| 3,877,595 | A | * | 4/1975 | Edelman | 414/24.5 |
| 3,889,402 | A | * | 6/1975 | Wheeler et al. | 111/101 |
| 4,067,369 | A | * | 1/1978 | Harmon | 144/34.1 |
| 4,718,816 | A | * | 1/1988 | King | 414/739 |
| 4,993,914 | A | * | 2/1991 | Riddle | 414/738 |
| 5,516,174 | A | * | 5/1996 | Squyres | 294/86.41 |
| 5,842,427 | A | * | 12/1998 | Hunter et al. | 111/101 |
| 5,873,615 | A | * | 2/1999 | McCullough | 294/106 |

* cited by examiner

*Primary Examiner*—Dean J. Kramer
(74) *Attorney, Agent, or Firm*—Woodard, Emhardt, Moriarty, McNett & Henry LLP

(57) ABSTRACT

An apparatus for moving large objects such as nursery stock incorporate two elongated arms, each including a handling member with a horizontal portion and a downwardly extending portion being attached to the end of each arm. When the arms are moved in relation to one another the handling members can encircle and support a load thereby allowing stable movement and loading of large objects such as nursery stock.

14 Claims, 3 Drawing Sheets

ARRANGEMENT FOR HANDLING OBJECTS SUCH AS NURSERY STOCK OR THE LIKE

CROSS-REFERENCE TO RELATED APPLICATION

The present application claims the benefit of U.S. Provisional Application Ser. No. 60/583,666 filed on Jun. 29, 2004, which is hereby incorporated by reference in its entirety.

BACKGROUND

The landscaping business often requires that large shrubs, trees, and other nursery stock be moved and/or transplanted either within the nursery area itself, or to a customer's vehicle or property. It is desirable that equipment used to facilitate such nursery stock loading and/or movement do so in a secure and efficient manner, regardless of the size, shape or bulk of the object being moved or loaded.

Loading equipment typically used for this purpose, such as skid steer loaders and fork trucks, are often unable to handle large nursery stock, e.g., trees having large root balls, without damaging the root ball and/or requiring help from additional persons. Due to the unique shape and uneven weight distribution of objects such as balled-trees, manual assistance is often needed in loading the object onto and off the equipment as well as loading and unloading the object from a transport vehicle, such as a truck or trailer. Ensuring that the object is securely held or maintained by the loading equipment often requires additional securing means, such as a strap or rope, to ensure that the object does not shift or fall during movement. Applying or using a strap or rope adds time and effort to the process which results in a less efficient, more expensive business operation. On the other hand, failure to use a strap or rope may result in damaged nursery stock.

Additionally, the design of skid steer loaders and fork trucks limit the load placement ability to certain positions, such that manual placement must be performed to locate the object (e.g., tree) in its desired spot. Manual placement or help may be needed, for example, when placement of an object into a truck with high sides, a truck with a trailer attached, or when the vehicle or trailer being loaded is only accessible from the side.

SUMMARY

In one embodiment of the present invention, an apparatus allows secure movement and placement of nursery stock without the need for manual assistance to avoid causing damage to the nursery stock. The apparatus includes arms which are securely mounted at one end and extend in a substantially parallel plane. The arms may be telescopic so as to increase the loading and unloading reach distance. The arms may be adapted to pivot such that the end of the arms furthest from the mounting point may be moved in relation to one another. A handling mechanism is coupled to the arms and comprises cooperating grippers that act to encircle and support nursery stock during movement.

In another embodiment a handling apparatus permits placement of large nursery stock in vehicles or trailers from a greater number of locations and positions than was previously possible.

Still other objects and advantages will become readily apparent to those skilled in this art from the following detailed description, wherein only the preferred embodiment of the invention is shown and described, simply by way of illustration of the best mode contemplated of carrying out the invention. As will be realized, the invention is capable of modifications in various obvious respects, all without departing from the invention. Consequently, the drawing and description are to be regarded as illustrative in nature, and not as restrictive.

DETAILED DESCRIPTION

For the purposes of promoting an understanding of the principles of the invention, reference will now be made to the embodiments illustrated herein, and specific language will be used to describe the same. It will nevertheless be understood that no limitation of the scope of the invention is thereby intended. Any alterations and further modifications in the described processes, systems, or devices, and any further applications of the principles of the invention as described herein, are contemplated as would normally occur to one skilled in the art to which the invention relates.

Moving large objects, such as root-balled trees or shrubs, whether for landscaping or developing nursery stock, is difficult because of the size of the planting and the uneven distribution of weight between the root ball and the trunk and foliage. Equipment typically used for these purposes, such as skid-steer loaders or fork lift trucks are often ill-equipped to handle large plantings, and significant physical effort is often required of one or more on-ground individuals to steady or maintain balance of the planting during lifting or transporting from one location to another.

One embodiment of the present invention provides an apparatus and method for easily handling large objects such as root-balled trees or other nursery plantings. An embodiment of the invention discloses attachment of the handling apparatus to equipment such as skid-steer loaders or fork trucks to allow easy transplanting or moving of large nursery stock, for example, without the need for additional help from on-ground individuals.

Figure 1:
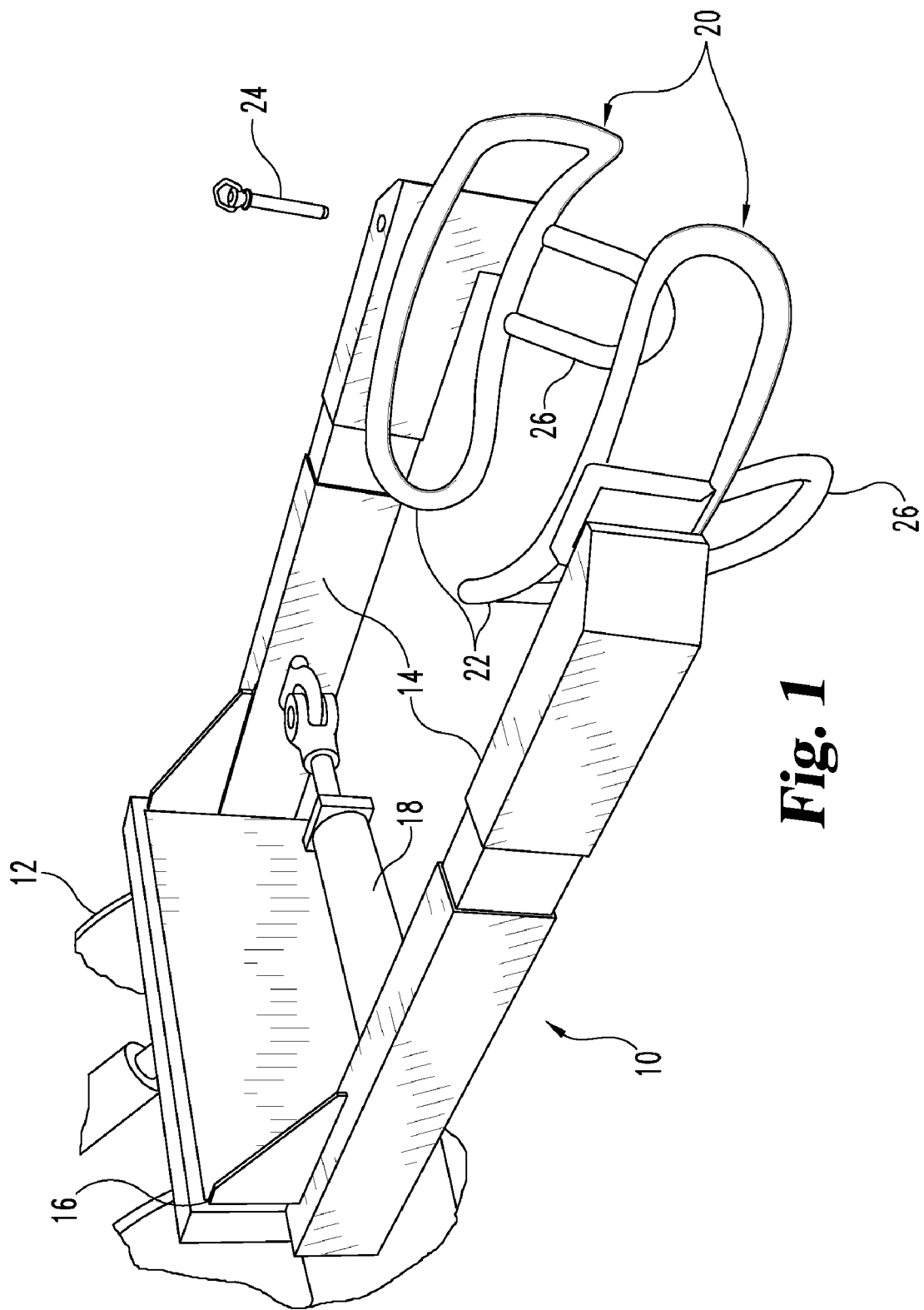
FIG. 1 illustrates an object handling apparatus in accordance with one embodiment of the present invention.

FIG. 1 illustrates a handling apparatus 10 in accordance with an embodiment of the present invention. Apparatus 10 is illustratively shown attached to a vehicle 12, which is illustratively shown as a track loader, but other types of equipment, such as skid-steer loaders and fork trucks, are equally suitable for use of apparatus 10. Apparatus 10 may be permanently, semi-permanently, or temporarily attached to vehicle 12, depending upon how apparatus 10 is intended to be used. The degree of permanency will result from the means of attachment, which may be accomplished, for example, by welding to create an essentially permanent structure, or through the use of bolts or pins to permit easier removal and replacement.

Apparatus 10 is shown as comprising a pair of arms 14 that extend outwardly, i.e., forward, from the front of vehicle 12. Arms 14 may be of fixed length, such as is shown on FIG. 1, or they may be made to be telescopic in order to accommodate different sized objects, to leverage load weight, to increase the reach of apparatus 10, or to provide a more compact structure for parking or storing vehicle 12 with apparatus 10 attached. The telescoping mechanism for arms 14 can be of any conventional design, including, but not limited to, hydraulic or gear-driven mechanisms, or arms 14 may be manually adjustable and held in their desired position by means such as cotter pins, for example. In FIG. 1, the ends of arms 14 closest to vehicle 12, i.e., proximal ends, are illustratively shown as being attached to hinge 16 which is in turn attached to vehicle 12, although other attachment mechanisms may also be used. Arms 14 are therefore movable in a horizontal plane via rotation about hinges 16 such that arms 14 may rotate or move toward or away from each other. Mechanism 18, illustratively shown as a hydraulic device, is shown attached to each of arms 14. Mechanism 18 is illustratively shown as being driven by the hydraulic system of vehicle 12 such that arms 14 can controllably be brought closer together or farther apart by the operator of vehicle 12.

At the ends of arms 14 remote or distal from vehicle 12 are mounted grippers 20 in positions such that they face each other. Grippers 20 each comprise an elongated member or component 22 disposed in a horizontal plane parallel to the extended dimension of arm 14. Member or component 22 is illustratively shown as being formed of tubular material that is bent or formed into the desired shape. Member 22 may be formed of a continuous piece of tubing, or it may be made up of several lengths of tubing attached together, such as by welding. Member 22 may be formed by other means as well, including being machined from a solid piece of material. Arms 14 and grippers 20 are preferably formed of a strong, durable material, such as steel, wrought iron, or any other suitable material that can withstand that weight and stresses that are applied during operation of apparatus 10.

Member 22 is shown as being curved or arcuately formed such that corresponding oppositely positioned members 22 together form a partial circle or enclosure, although other shapes or contours are possible. The curved shape of members 22 cooperate with each other to at least partially encircle or embrace the load being moved. The shape of members 22 also allows apparatus 10 to accommodate objects, e.g. tree root balls, of different sizes merely by adjusting the spacing between member 22 by use of mechanism 18. Members 22 may be formed of different shapes as well, such as by increasing or decreasing the length or amount of curvature, so that grippers 20 may be configured to accommodate different ranges of object sizes. Grippers 20 are illustratively shown in FIG. 1 as being attached to arms 14 by attachment, e.g., cotter, pins 24. The use of attachment pins 24 allows grippers 20 to be removed for repair or replacement, or to permit different sized or shaped grippers, or even other devices, to be installed in place of grippers 20.

Grippers 20 also comprise load stabilizing members 26, illustratively shown in FIG. 1 as extending downward from, and generally perpendicular to, members 22. Load stabilizing members 26 are also shown as being angled and/or curved slightly inwardly toward each other, such that as arms 14 are brought closer together, grippers 20 form the appearance of a basket, with members 22 and members 26 cooperating to provide both side and bottom support for the load. Other shapes of members 26 are also possible, such as enlarging the lower portion of members 26 to provide even more underside support. Members 26 are preferably made from the same material as members 22 in order to simplify construction and provide a uniform appearance of grippers 20. Grippers 20 may therefore be made of a single piece of tubular material, or be formed from a single piece of material, or be made or formed of multiple pieces that are attached together during manufacture of apparatus 10.

Figure 3:
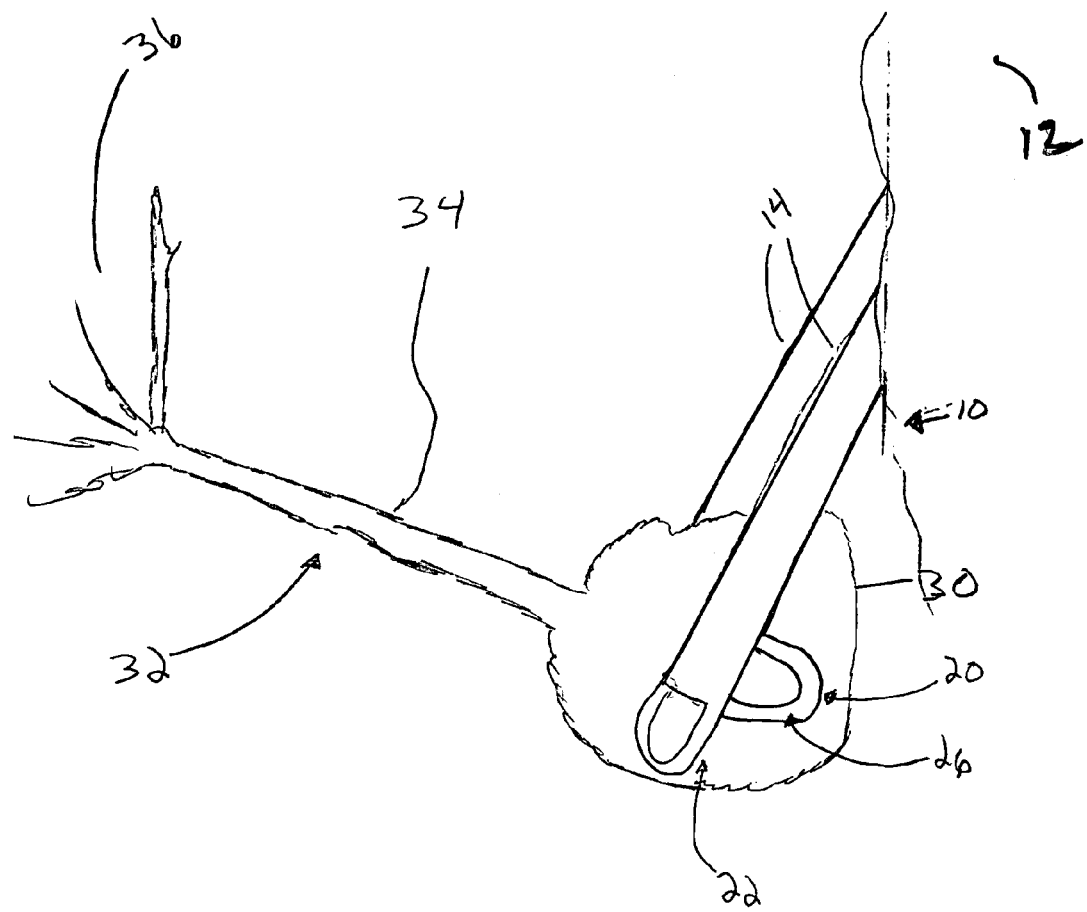
FIG. 3 illustrates the operation of an object handling apparatus in accordance with an embodiment of the present invention.
Figure 2:
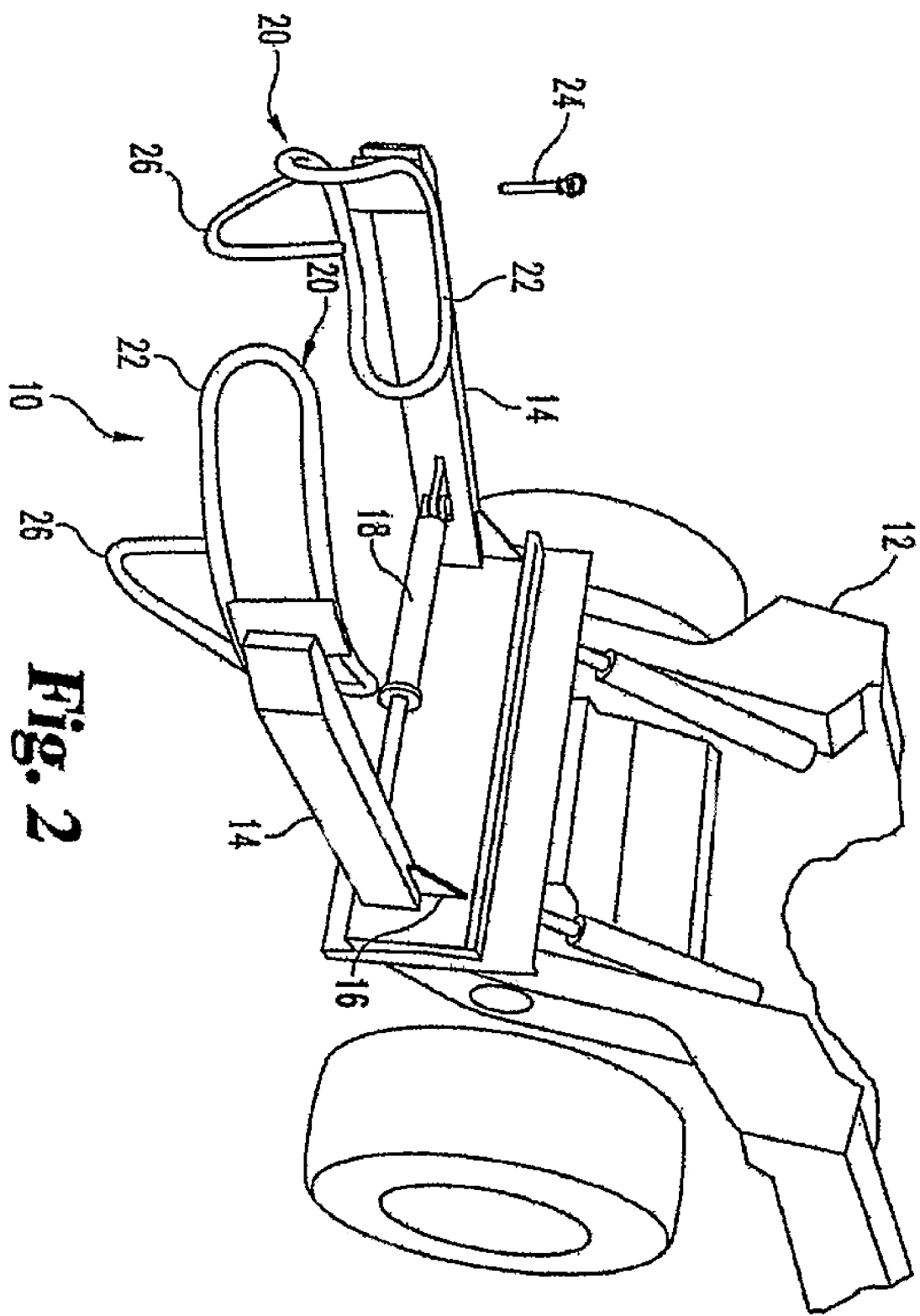
Figure 3:
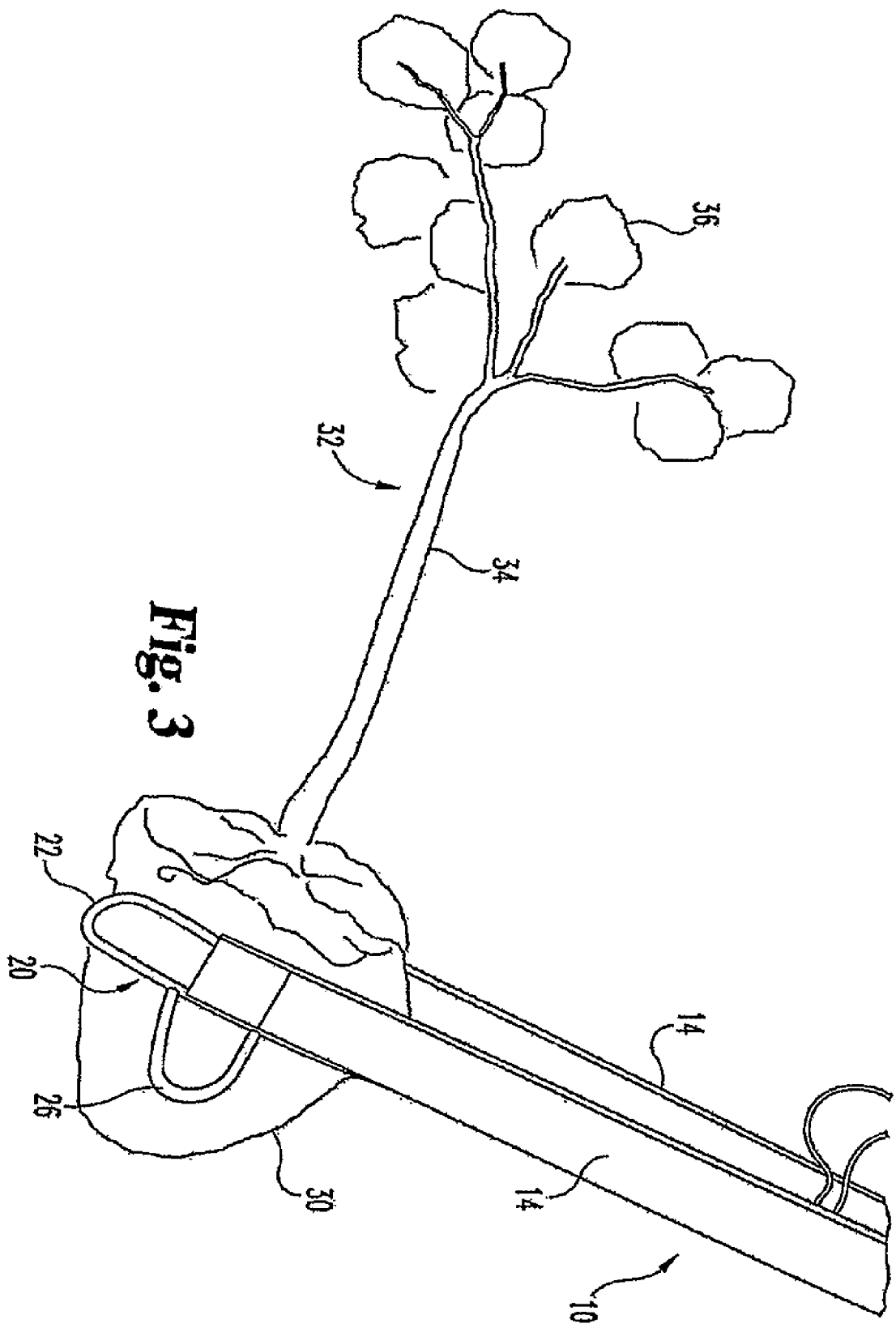

FIG. 3 illustrates one embodiment of apparatus 10 in operation. As can be seen, arms 14 are positioned such that grippers 50 are in contact with the root ball 30 of a representative object, in this case tree 32. Members 22 of grippers 20 partially encircle the equatorial circumference of root ball 30 while members 26 at least partially encircle the polar circumference of root ball 30. Trunk 34 of tree 32 is shown angled away from apparatus 10, such that trunk 34 and foliage 36 exert a significant leveraged force at the contact points of root ball 30 and grippers 20. The unique shape of grippers 20, however, act to stabilize tree 32 so that it can be lifted and/or moved in the position shown without twisting or falling, or without exerting so much pressure on root ball 30 that tree 32 is damaged. As can be seen in FIG. 3, whatever angle or position tree 32 is in while it is being carried or moved, a portion of gripper 20 will encircle root ball 30 and another portion of gripper 20 will support or cradle the underside of root ball 30. In this way, root ball 30 is always supported in two perpendicular planes so that tree 32, or whatever type of object is being maneuvered or moved, is always stabilized when being lifted or moved by apparatus 10, regardless of the size or positioning of the object. Root ball 30 is therefore not distorted or damaged even when vehicle 12 is traveling over rough terrain. The design of grippers 20 also permits the easy removal of nursery stock that has healed-in to its display or growing location. When removing nursery stock in this healed-in condition, grippers 20 are positioned and moved so that members 26 can penetrate the soil around the root ball of the tree or shrub that is desired to be moved. Arms 14 can then be brought toward each other until grippers 20 are in position to support the underside of the planting's root ball, thereby permitting a supported lifting of the tree, shrub, or other planting.

Apparatus 10 may also be used to lift or move objects other than trees or nursery plantings. Boulders or other heavy articles that are matched with the size and shape of grippers 20, and within the lifting specifications of vehicle 12 may also be lifted and/or transported.

In one particular embodiment, the weight of apparatus 10 is approximately 370 pounds. Arms 14 are capable of telescoping such that the reach of grippers 20 is between 61 and 85 inches. With arms 14 fully retracted, apparatus 10 is capable of lifting objects up to 1800 pounds. In another embodiment, apparatus 10 weights of the order of 330 pounds and has fixed arms, which provide a reach of between 62 and 72 inches. In this embodiment, apparatus 10 is capable of lifting or moving objects of up to 2500 pounds. The use of apparatus 10 therefore allows trees and boulders, for example, to be moved by one person, without the need for any on-ground help.

While the invention or inventions described herein have been illustrated and described in detail in the drawings and foregoing description, the same is to be considered as illustrative and not restrictive in character, it being understood that all changes, modifications and equivalents that come within the spirit of the invention or inventions disclosed are desired to be protected. The present invention contemplates modifications as would occur to those skilled in the art. It is also contemplated that processes embodied in the present invention can be altered, rearranged, substituted, deleted, duplicated, combined, or added to other processes as would occur to those skilled in the art without departing from the spirit of the present invention.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

What is claimed is:

1. An apparatus for use with a vehicle adapted for handling bulky objects, including nursery stock or the like, comprising:
    first and second elongated arms coupled to said vehicle at a proximal end and extending outwardly from said vehicle, said arms being substantially parallel in a first plane;
    first handling means coupled to said first elongated arm, said first handling means comprising a first arcuate member disposed in the region of the distal end of said first arm substantially in said first plane with the interior of the arc formed by said first arcuate member facing said second arm, and a first stabilizing member disposed substantially perpendicular to said first arcuate member and extending from said first arcuate member; and
    second handling means coupled to said second elongated arm, said second handling means comprising a second arcuate member disposed in the region of the distal end of said second arm substantially in said first plane with the interior of the arc formed by said second arcuate member facing said first arm, and a second stabilizing member disposed substantially perpendicular to said second arcuate member and extending from said second arcuate member, such that said first and second arcuate members cooperate to embrace an object to be handled in said first plane and said first and second stabilizing members cooperate to embrace said object in a second plane substantially orthogonal to said first plane.

2. The apparatus of claim 1, wherein said first and second elongated arms are coupled to said vehicle by a hinge which allows said first and second arms to move substantially in said first plane.

3. The apparatus of claim 2, further comprising means for moving said first and second arms in said first plane.

4. The apparatus of claim 3, wherein said means for moving said arms operates hydraulically.

5. The apparatus of claim 1, wherein said first and second arcuate members and said first and second stabilizing members comprise tubular structures forming elongated shapes.

6. The apparatus of claim 1, wherein said first and second elongated arms are telescopic.

7. The apparatus of claim 1, wherein said first handling means is coupled to said first elongated arm and said second handling means is coupled to said second elongated arm by attachment pins.

8. An apparatus for handling bulky objects, including nursery stock or the like, comprising:
    first and second elongated arms being substantially parallel in a first plane;
    first handling means coupled to said first elongated arm and comprising a first member disposed in the region of the distal end of said first arm and facing said second arm, and a second member coupled to said first member and extending substantially perpendicular from said first member; and
    second handling means coupled to said second elongated arm and comprising a first member disposed in the region of the distal end of said second arm and facing said first arm, and a second member coupled to said first member and extending substantially perpendicular from said first member, wherein said first members of said first and second handling means cooperate to embrace an object to be handled in a first plane and said second members of said first and second handling means cooperate to embrace said object to be handled in a second plane substantially orthogonal to said first plane.

9. The apparatus of claim 8, wherein said first and second arms are coupled to a vehicle at their proximal ends.

10. The apparatus of claim 8, wherein said first and second arms are adapted to move relative to each other in said first plane.

11. The apparatus of claim 8, wherein said first member of said first handling means comprises an arcuate shape with the interior of the arc formed by said arcuate shape facing said first member of said second handling means.

12. The apparatus of claim 8, wherein said first member of said second handling means comprises an arcuate shape with the interior of the arc formed by said arcuate shape facing said first member of said first handling means.

13. The apparatus of claim 8, wherein said second member of said first handling means comprises an arcuate shape with the interior of the arc formed by said arcuate shape facing said second member of said second handling means.

14. The apparatus of claim 8, wherein said second member of said second handling means comprises an arcuate shape with the interior of the arc formed by said arcuate shape facing said second member of said first handling means.

* * * * *

UNITED STATES PATENT AND TRADEMARK OFFICE
CERTIFICATE OF CORRECTION

Figure 2:
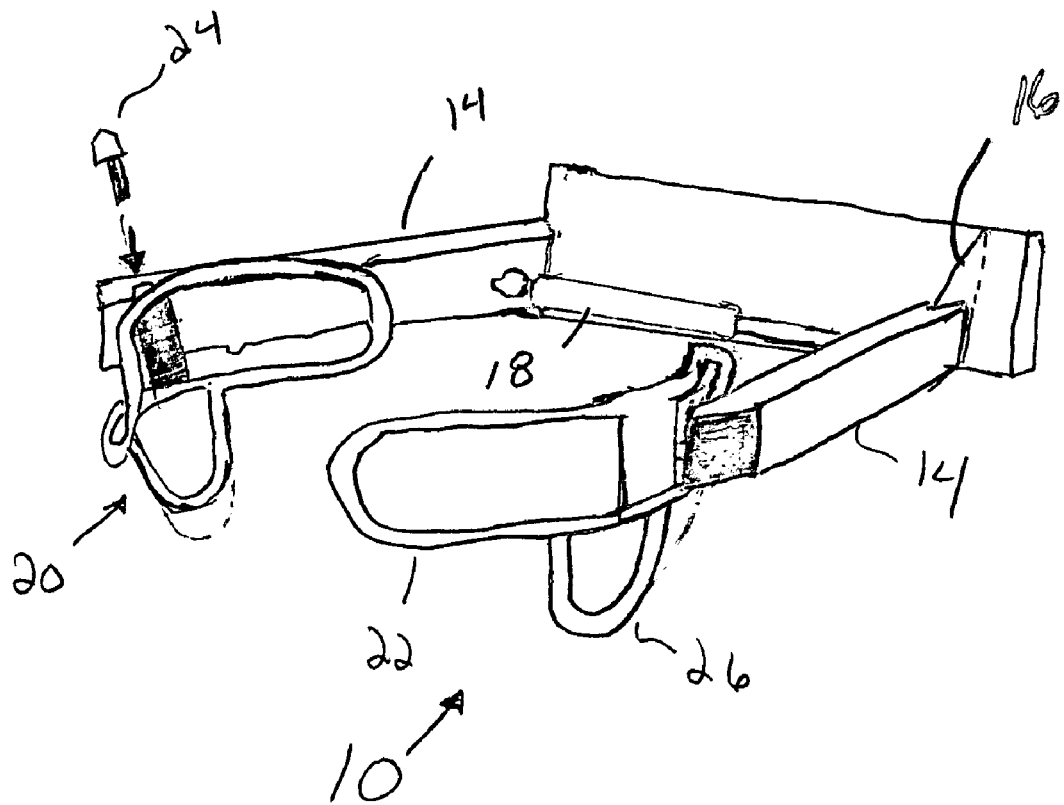
FIG. 2 illustrates an object handling apparatus in accordance with another embodiment of the present invention.

PATENT NO.       : 7,198,312 B2
APPLICATION NO.  : 11/170204
DATED            : April 3, 2007
INVENTOR(S)      : Milan Blaho It is certified that error appears in the above-identified patent and that said Letters Patent is hereby corrected as shown below:

1. In the drawing, Sheet 2, Figure 2, the freehand written caption, "Fig. 2" is replaced with the typewritten equivalent, --Fig.2--

2. In the drawing, Sheet 3, Figure 3, the freehand written caption, "Fig. 3" is replaced with the typewritten equivalent, --Fig. 3--

Signed and Sealed this

Eighteenth Day of September, 2007

JON W. DUDAS
*Director of the United States Patent and Trademark Office*